United States Patent [19]
Aso et al.

[11] Patent Number: 5,783,047
[45] Date of Patent: Jul. 21, 1998

[54] HEAT INTEGRATED DISTILLATION COLUMN

[75] Inventors: Kazumasa Aso, Kawanishi; Hiroshi Matsuo, Habikino; Hideo Noda, Amagasaki; Tomoaki Takada; Nobuyuki Kobayashi, both of Tokyo, all of Japan

[73] Assignees: Kimura Chemical Plants Co., Ltd.; Kansai Chemical Engineering Co., Ltd., both of Amagasaki; Maruzen Petrochemical Co., Ltd., Tokyo, all of Japan

[21] Appl. No.: 637,043

[22] Filed: Apr. 24, 1996

Related U.S. Application Data

[63] Continuation of PCT/JP95/01706 filed Aug. 28, 1995.

[30] Foreign Application Priority Data

Aug. 29, 1994 [JP] Japan ........................... 228664
Aug. 15, 1995 [JP] Japan ........................... 230768

[51] Int. Cl.$^6$ .................................................... B01D 3/02
[52] U.S. Cl. .................... 202/154; 202/158; 202/160; 202/235; 202/237; 203/73; 203/77
[58] Field of Search ............................. 202/154, 158, 202/160, 235, 237; 203/25, 27, 94, 73, 77, 41; 159/27.1, 27.4; 261/DIG. 32, 150

[56] References Cited

U.S. PATENT DOCUMENTS

| | | | |
|---|---|---|---|
| 2,117,337 | 5/1938 | Lobl et al. | 159/27.1 |
| 2,556,186 | 6/1951 | Hegenbarth | 159/27.1 |
| 3,227,630 | 1/1966 | Beckman | 159/27.1 |
| 3,242,970 | 3/1966 | Schmole | 159/27.1 |
| 4,025,398 | 5/1977 | Haselden | 203/25 |
| 4,234,391 | 11/1980 | Seader | 203/26 |
| 5,246,541 | 9/1993 | Ryham | 159/13.2 |
| 5,250,151 | 10/1993 | Huercanos | 159/47.1 |
| 5,432,952 | 7/1995 | Stout | 202/174 |

FOREIGN PATENT DOCUMENTS 56-154801  11/1981  Japan .

*Primary Examiner*—Nina Bhat
*Attorney, Agent, or Firm*—Armstrong, Westerman, Hattori, McLeland & Naughton

[57] ABSTRACT

A monotube or multitube 2 is coupled to a body shell 1 via tube plates 3a and 3b at both ends, so that a tube interior 4 and a tube exterior 5 of the monotube or multitube 2 are isolated from each other. A difference is made in operating pressure between the tube interior 4 and the tube exterior 5, so that one of the tube interior 4 and the tube exterior 5 is used as a lower-pressure column and the other is used as a higher-pressure column. A wall of the tube is used as a heat transfer surface, so that heat is transferred from the higher pressure side (higher temperature side) to the lower pressure side (lower temperature side). Monotubes or multitubes 2 having different diameters are connected to each other via a reducer 20, so that a monotube or multitube 2 whose diameters are varied stepwise is disposed between the tube plates 3a and 3b at the upper and lower ends, thereby increasing the column cross-sectional area as moving from the top to the bottom of the column in the enriching section (tube interior) 4, and decreasing the column cross-sectional area as moving from the top to the bottom of the column in the stripping section (tube exterior) 5.

12 Claims, 11 Drawing Sheets

HEAT INTEGRATED DISTILLATION COLUMN

This application is a continuation of International Application No. PCT/JP95/01706, filed Aug. 28, 1995, and claiming priority based on Japanese Patent Application Nos. 228664 and 230768 respectively filed on Aug. 29, 1994 and Aug. 15, 1995.

TECHNICAL FIELD

The present invention relates to a distillation column, and particularly to a heat integrated distillation column comprising a lower-pressure column and a higher-pressure column between which heat exchange is performed.

BACKGROUND ART

Figure 11:
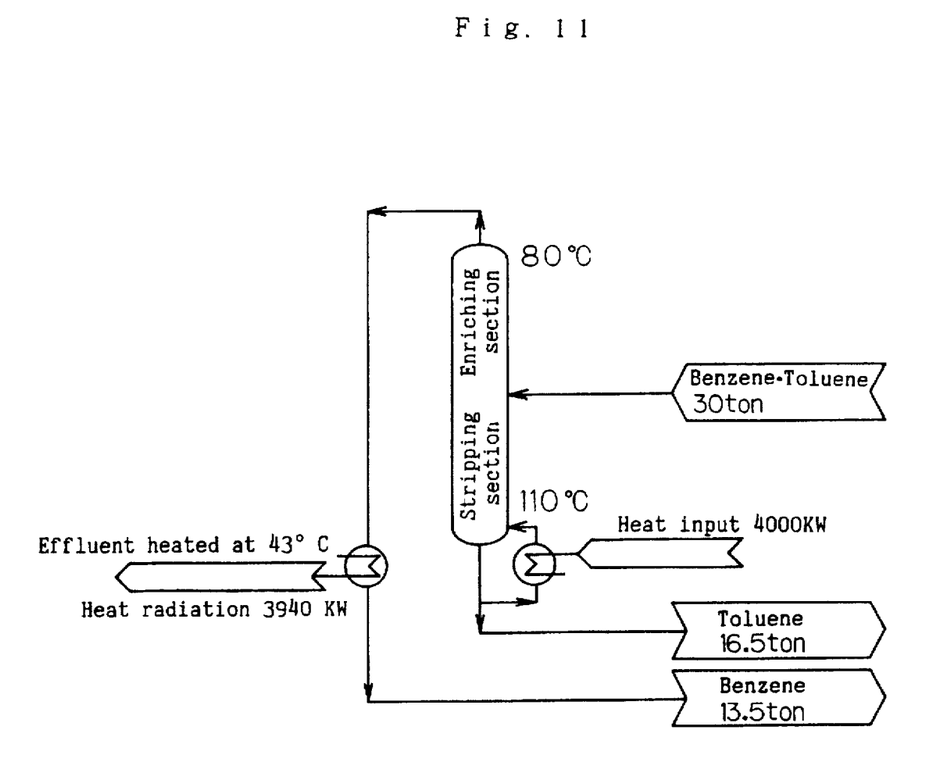
FIG. 11 is a diagram showing an example of an operating condition of the conventional distillation column.

Conventionally, various distillation operations are performed in petrochemistry and other fields. For the conventional distillation column shown in FIG. 11 which is used for the distillation operation, if 30 tons of benzene and toluene are to be distilled so as to recover 16.5 tons of toluene and 13.5 tons of benzene, heat of about 4000 kW is input and heat of 3940 kW is radiated. The radiated heat is discharged as heated effluent at 43° C. to the outside of the system. Because the temperature of the heated effluent is as low as 43° C., the heat contained in the effluent cannot be utilized, and the effluent is directly disposed. This is not preferable from the standpoint of resource saving and energy saving.

The invention has been conducted in order to solve the above-mentioned problem. It is an object of the invention to provide a heat integrated distillation column with a superior energy-saving property.

DISCLOSURE OF THE INVENTION

It is reasonable in principle and has been academically recognized that a heat integrated distillation column which comprises a lower-pressure column and a higher-pressure column and in which heat exchange is performed between the two columns so as not to require heat to be supplied to and received from any other devices is an ultimate apparatus from the viewpoint of promotion of the energy saving for the distillation operation.

Actually, however, such a heat integrated distillation column is inhibited from being put into practice because of various reasons which include a problem in cost, a problem in that it is very difficult in production to incorporate a heat exchanging section into a conventional distillation column, and a problem in that a heat exchanging section cannot be incorporated so as to accurately realize performances which can satisfy the user's requirements.

In view of the above problems, the inventors have conducted various experiments and studies, and have found the following. As in a multi-tubular heat exchanger, a tube is coupled to a body shell via tube plates at both ends, so that the tube interior is isolated from the tube exterior. A difference is made between the operating pressures of the tube interior and the tube exterior and one of the tube interior and the tube exterior is used as a lower-pressure column and the other is used as a higher-pressure column. The wall of the tube is used as a heat transfer surface, so that the heat exchange is performed between the columns. As a result, a heat integrated distillation column which can be brought into practice can be obtained. Thereafter, the inventors have performed further experiments and studies, and finally completed the invention.

2

Namely, in the heat integrated distillation column of the invention, a monotube or a multitube is coupled to a body shell via tube plates at both ends, thereby isolating a tube interior from a tube exterior, a difference is made in operating pressure between the tube interior and the tube exterior, so as to differentiate an operating temperature of the tube interior from that of the tube exterior, the wall of the monotube or the multitube is used as a heat transfer surface, and heat is transferred from a higher pressure side to a lower pressure side, thereby constituting one distillation column while using the higher pressure side as an enriching section and the lower pressure side as a stripping section.

The ratio of the column cross-sectional area of the enriching section to the column cross-sectional area of the stripping section (column cross-sectional area of the enriching section/column cross-sectional area of the stripping section) is decreased toward the top of the column and increased toward the bottom of the column.

The tube interior is used as the enriching section, the tube exterior is used as the stripping section, the ratio of the total cross-sectional area of the tube interior to the total cross-sectional area of the tube exterior (total cross-sectional area of the tube interior/total cross-sectional area of the tube exterior) is decreased toward the top of the column and increased toward the bottom of the column.

The tube interior is used as the enriching section, the tube exterior is used as the stripping section, and the ratio of the total cross-sectional area of the tube interior to that of the tube exterior (total cross-sectional area of the tube interior/total cross-sectional area of the tube exterior) is stepwise decreased toward the top of the column and stepwise increased toward the bottom of the column.

The tube interior is used as the enriching section, the tube exterior is used as the stripping section, the tube interior and the tube exterior are filled with packing, and each of the tube interior and the tube exterior is provided with inlets and outlets of gas and liquid.

The tube interior is used as the enriching section, the tube exterior is used as the stripping section, and the tube interior is filled with regular packing, the tube exterior is filled with irregular packing, and each of the tube interior and the tube exterior is provided with inlets and outlets of gas and liquid.

The tube interior is used as the enriching section, the tube exterior is used as the stripping section, shelves are provided in the tube interior and the tube exterior, and each of the tube interior and the tube exterior is provided with inlets and outlets of gas and liquid.

The tube interior is used as the enriching section, the tube exterior is used as the stripping section, shelves are provided in the tube interior, and the tube exterior is filled with packing, and each of the tube interior and the tube exterior is provided with inlets and outlets of gas and liquid.

The tube interior is used as the enriching section and the tube exterior is used as the stripping section. The tube interior is filled with packing, shelves are provided in the tube exterior, and each of the tube interior and the tube exterior is provided with inlets and outlets of gas and liquid.

In the heat integrated distillation column of the invention, a monotube or a multitube is coupled to a body shell via tube plates at upper and lower ends, thereby isolating the tube interior from the tube exterior, a difference is made in operating pressure between the tube interior and the tube exterior, so as to differentiate the operating temperature of the tube interior from that of the tube exterior, the wall of the monotube or the multitube is used as a heat transfer surface, and heat is transferred from a higher pressure side to a lower pressure side, thereby constituting one distillation column while using the higher pressure side as an enriching section and the lower pressure side as a stripping section. Monotubes or multi-tubes having different diameters are connected to each other via a reducer, so that monotubes or multitubes whose diameters are stepwise varied are disposed between the tube plates at the upper and lower ends, thereby increasing the cross-sectional area of the column as moving from the top to the bottom of the column in the enriching section, and decreasing the cross-sectional area of the column as moving from the top to the bottom of the column in the stripping section, whereby a vapor amount load is uniformized so that an ascending vapor velocity does not exceed an allowable velocity.

The interior of the monotubes or the multitubes which are connected to each other via the reducer is used as the enriching section, the tube exterior is used as the stripping section, and the ratio of the total cross-sectional area of the tube interior to the total cross-sectional area of the tube exterior (total cross-sectional area of the tube interior/total cross-sectional area of the tube exterior) is stepwise decreased toward the top of the column, and stepwise increased toward the bottom of the column.

The interior of the monotubes or the multitubes which are connected to each other via the reducer is used as the enriching section, the tube exterior is used as the stripping section, the tube interior and the tube exterior are filled with packing, and each of the tube interior and the tube exterior is provided with inlets and outlets of gas and liquid.

In the heat integrated distillation column of the invention, a tube is coupled to a body shell via tube plates at both ends, thereby isolating the tube interior from the tube exterior, and a difference is made in operating pressure between the tube interior and the tube exterior, thereby one of the tube interior and the tube exterior is used as a lower-pressure column, the other is used as a higher-pressure column and the wall of the tube is used as a heat transfer surface, so that heat is transferred from the higher pressure side (higher temperature side) to the lower pressure side (lower temperature side). As a result, it is possible to obtain a heat integrated distillation column for practical use.

That is, according to the heat integrated distillation column of the invention, in both the tube interior and the tube exterior, vapor which enters from the lower side and goes out of the upper side comes in contact with liquid which enters from the upper side and flows to the lower side, on the surface of the packing or on the shelves. At this time, heat transfer and mass transfer occur, and hence the distillation operation is performed. As described above, in the heat integrated distillation column of the invention, two distillation columns, i.e., a higher-pressure column and a lower-pressure column are disposed in one column.

Next, for the sake of facilitating the understanding, the heat integrated distillation column of the invention will be described with reference to FIG. 4. The heat integrated distillation column of the invention has a construction in which the enriching section (portion above a solution supplying stage) and the stripping section (portion below the solution supplying stage) in the conventional distillation column are separated from each other and disposed in parallel, and the operating pressure of the enriching section is made higher than that of the stripping section so that the operating temperature of the enriching section becomes higher than that of the stripping section. In this configuration, if there exists a heat transfer surface between them, heat transfer occurs from the enriching section to the stripping section. In the heat integrated distillation column of the invention, the wall of the monotube or the multitube functions as the heat transfer wall, and the heat transfer occurs from the enriching section to the stripping section.

In contrast to the conventional distillation column in which the heat input is provided by a reboiler, according to the heat integrated distillation column of the invention, the heat input is provided in the whole of the stripping section, with the result that the load on the reboiler can be reduced. In the conventional distillation column, the heat radiation is performed by a condenser disposed at the top of the column. In contrast, according to the heat integrated distillation column of the invention, the heat radiation is performed in the whole of the enriching section with the result that the load on the condenser can be reduced. Accordingly, it is possible to remarkably save energy as compared with the conventional distillation column.

In processes including distillation, generally, if reversible separation can be performed in a separating operation, the work amount at the time is the minimum work amount required for the separation. In the heat integrated distillation column of the invention, the cooling in each stage of the enriching section and the heating in each stage of the stripping section are made closer to such a condition as much as possible. In this connection, the condition where no reboiler or no condenser is provided is the ideal and ultimate condition. In the academic and theoretical view point, there may exist such a condition. In the industrial view point, however, a reboiler and a condenser which are smaller in size than conventional ones are employed.

In the heat integrated distillation column of the invention, the tube interior may be filled with regular packing so that the tube interior is used as the enriching section. The tube exterior may be filled with irregular packing so that the tube exterior is used as the stripping section.

In the case where the tube interior and the tube exterior are filled with packing, there are several combinations in selection, as to which one of the tube interior and the tube exterior is used as the enriching section and the other is used as the stripping section, and also as to which of regular packing and irregular packing is adopted as the packing with which the tube interior and the tube exterior are respectively filled.

Figure 5:
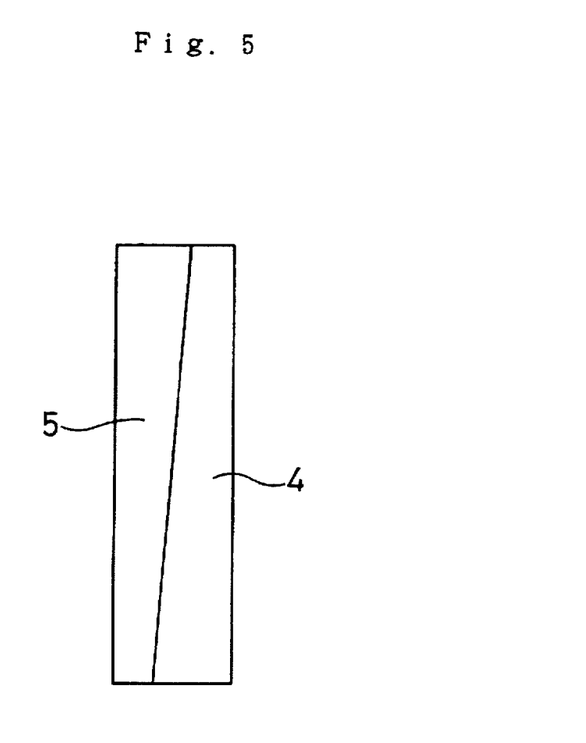
FIG. 5 is a diagram showing the relationship between column cross-sectional areas of a stripping section and an enriching section in a heat integrated distillation column.
Figure 6:
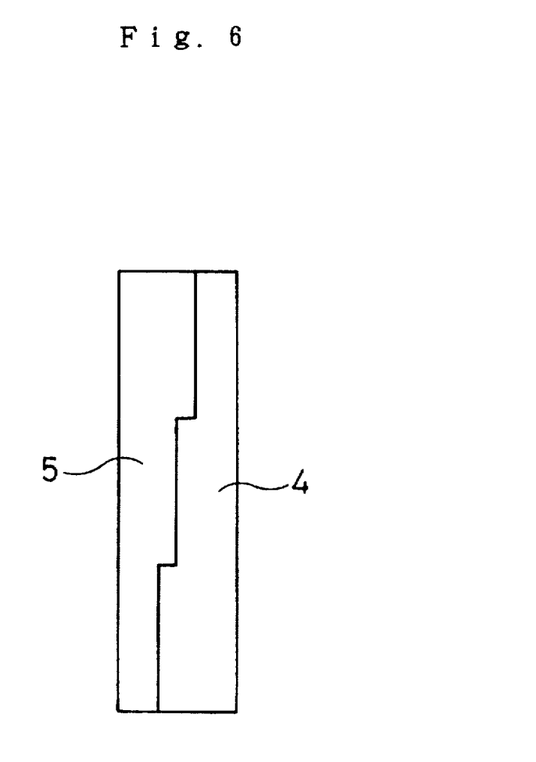
FIG. 6 is a diagram showing the relationship between column cross-sectional areas of a stripping section and an enriching section in a heat integrated distillation column.

In a heat integrated distillation column, vapor is condensed in the enriching section, and hence the flow rate of the vapor is decreased toward the upper portion and liquid is vaporized in the stripping section, so that the flow rate of the vapor is increased toward the upper portion. Therefore, in order to set the relationship between the ascending vapor and the column cross-sectional area to be uniform irrespective of the height of the column, the column cross-sectional area should be decreased when moving from the bottom to the top of the column in the enriching section, and increased when moving from the bottom to the top of the column in the stripping section. In order to uniformize the vapor amount load, as shown in FIG. 5, it is the most desirable that the ratio of the column cross-sectional area of a stripping section 5 to the column cross-sectional area of an enriching section 4 is continuously varied when moving from the top to the bottom of the column. Alternatively, as shown in FIG. 6, in a range where the velocity of the ascending vapor does not exceed the allowable vapor velocity, the ratio of the column cross-sectional area of the stripping section 5 to the column cross-sectional area of the enriching section 4 may be stepwise varied at appropriate column height pitches. In this case, it is also possible to realize a uniform vapor amount load which is sufficient for a practical use.

Figure 1:
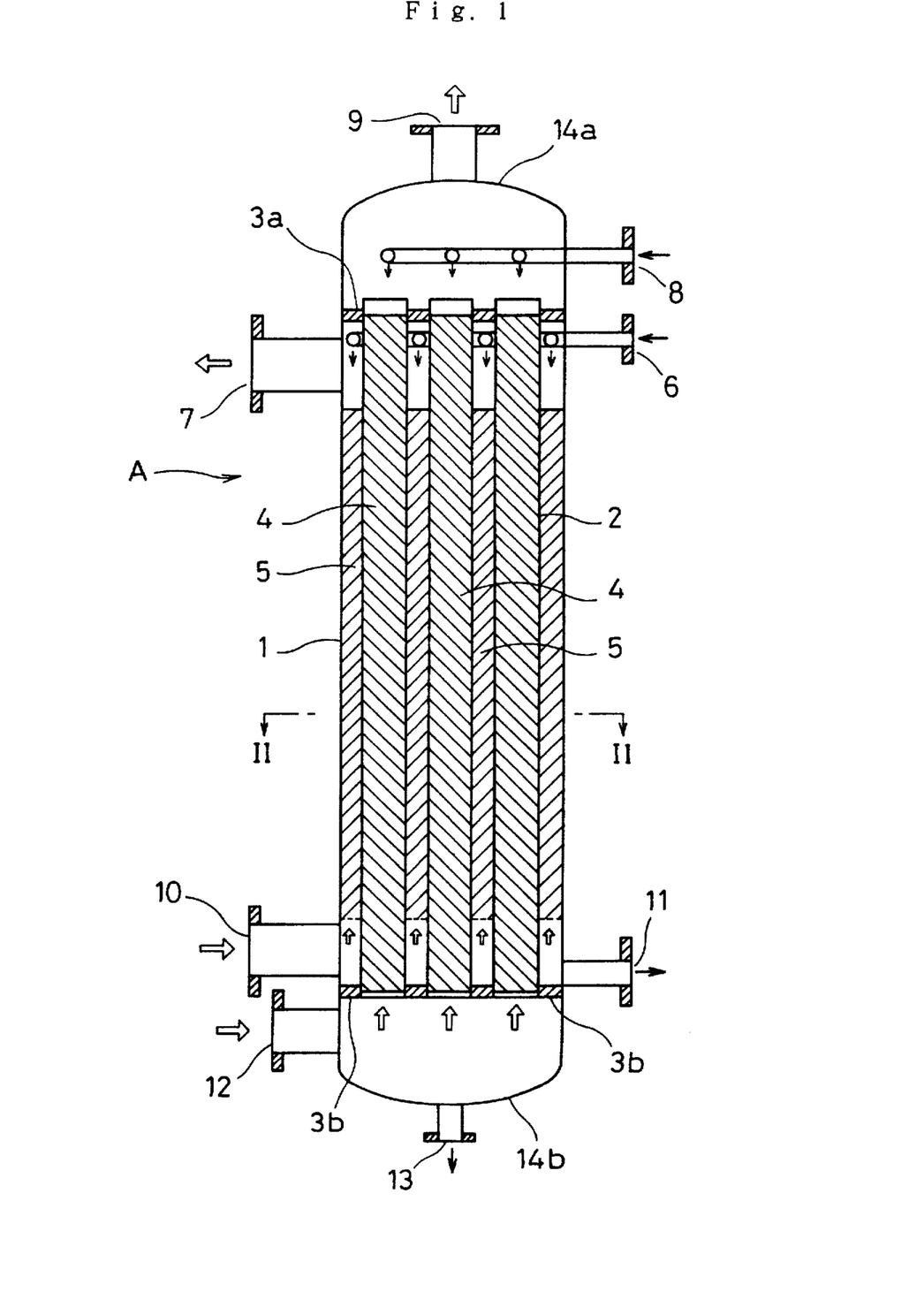
FIG. 1 is a diagram showing a preferred embodiment of the heat integrated distillation column (structure constituting the column) of the invention.

In an industrial apparatus, for example, a plurality of heat integrated distillation columns (structure constituting the column) shown in FIG. 1 are stacked so as to realize a predetermined distillation performance, whereby a heat integrated distillation column (FIG. 3) is constructed. The construction of the heat integrated distillation columns of FIGS. 1 and 3 will be described in detail in "Best Mode for Carrying Out the Invention" below. For example, it is assumed that the height to which the interior of a monotube or a multitube is filled is set to be 3 to 8 m. In general, a plurality of such stages are stacked so as to construct one heat integrated distillation column. In some cases, it is sufficient to provide one stage. In each stage, the diameter of the monotube or the multitube in the interior is decreased toward the top of the column, so that the ratio of the total cross-sectional area of the enriching section to the total cross-sectional area of the stripping section (total cross-sectional area of the tube interior/total cross-sectional area of the tube exterior) can be varied.

Monotubes or multitubes having different diameters are connected to each other via a reducer so that monotubes or multitubes whose diameters are varied stepwise are disposed between the tube plates at the upper and lower ends. In this way, the column cross-sectional area is increased as moving from the top to the bottom of the column in the enriching section, and decreased as moving from the top to the bottom of the column in the stripping section. As a result, it is possible to easily and surely produce a heat integrated distillation column in which the vapor amount load from the top to the bottom of the column can be made uniform to a level which is negligible in a practical use. Only by connecting monotubes or multitubes to each other via a reducer, it is possible to dispose monotubes or multitubes whose diameters are varied stepwise between the tube plates at upper and lower ends. Thus, it is possible to surely obtain a heat integrated distillation column which has a simple construction and can be easily produced and maintained.

In the heat integrated distillation column of the invention, it is preferred that the interior and the exterior of monotubes or multitubes connected each other via a reducer are used as an enriching section and a stripping section, respectively, and that the ratio of the total cross-sectional area of the tube interior to the total cross-sectional area of the tube exterior (total cross-sectional area of the tube interior/total cross sectional area of the tube exterior) is stepwise decreased toward the top of the column, and stepwise increased toward the bottom of the column. This is because, in general, it is desired that the diameter of the higher pressure side is small in the view point of the strength, and the portion of a higher operating temperature is positioned at an inner portion in the view point of the thermal insulation. For these reasons, it is desired that the tube interior is the enriching section (higher pressure (higher temperature) side), and the tube exterior which surrounds the tube interior is used as the stripping section (lower pressure (lower temperature) side).

The interior and exterior of the monotubes or multi-tubes connected to each other via a reducer may be filled with packing, so that it is possible to efficiently produce a heat integrated distillation column with superior accuracy in distillation separation and a superior energy-saving effect.

BEST MODE FOR CARRYING OUT THE INVENTION

Hereinafter, the preferred embodiments of the invention will be described in detail with reference to the accompanying drawings.

(1) Preferred Embodiments of the Invention

Figure 2:
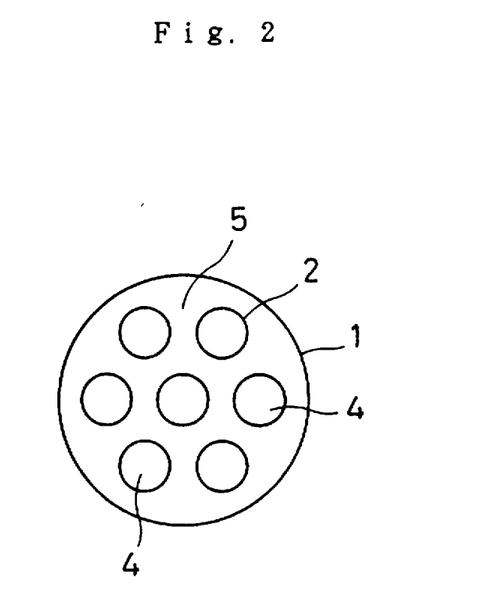
FIG. 2 is a cross section view taken along a line II—II of the heat integrated distillation column of FIG. 1.

As shown in FIGS. 1 and 2, a heat integrated distillation column (structure constituting the column) A comprises a body shell 1, and a multitube 2 which is inserted into the body shell 1 and coupled to the body shell 1 via tube plates (an upper tube plate 3a and a lower tube plate 3b) at both ends, so that the tube interior (enriching section) 4 of the multitube 2 is isolated from the tube exterior (stripping section) 5. The tube interior (enriching section) 4 is filled with regular packing, and the tube exterior (stripping section) 5 is filled with irregular packing.

The upper portion of the body shell 1 is provided with a stripping-section liquid inlet 6 for supplying liquid to the tube exterior (stripping section) 5, and a stripping-section vapor outlet 7 for discharging vapor from the tube exterior (stripping section) 5. An end chamber 14a communicating with the tube interior (enriching section) 4 and above the upper tube plate 3a is provided with a enriching-section liquid inlet 8 for supplying liquid to the tube interior (enriching section) 4, and a enriching-section vapor outlet 9 for extracting vapor from the tube interior (enriching section) 4.

On the other hand, the lower portion of the body shell 1 is provided with a stripping-section vapor inlet 10 for supplying vapor to the tube exterior (stripping section) 5, and a stripping-section liquid outlet 11 for extracting liquid from the tube exterior (stripping section) 5. An end chamber 14b communicating with the tube interior (enriching section) 4 and below the lower tube plate 3b is provided with a enriching-section vapor inlet 12 for supplying vapor to the tube interior (enriching section) 4, and a enriching-section liquid output 13 for extracting liquid from the tube interior (enriching section) 4.

Figure 3:
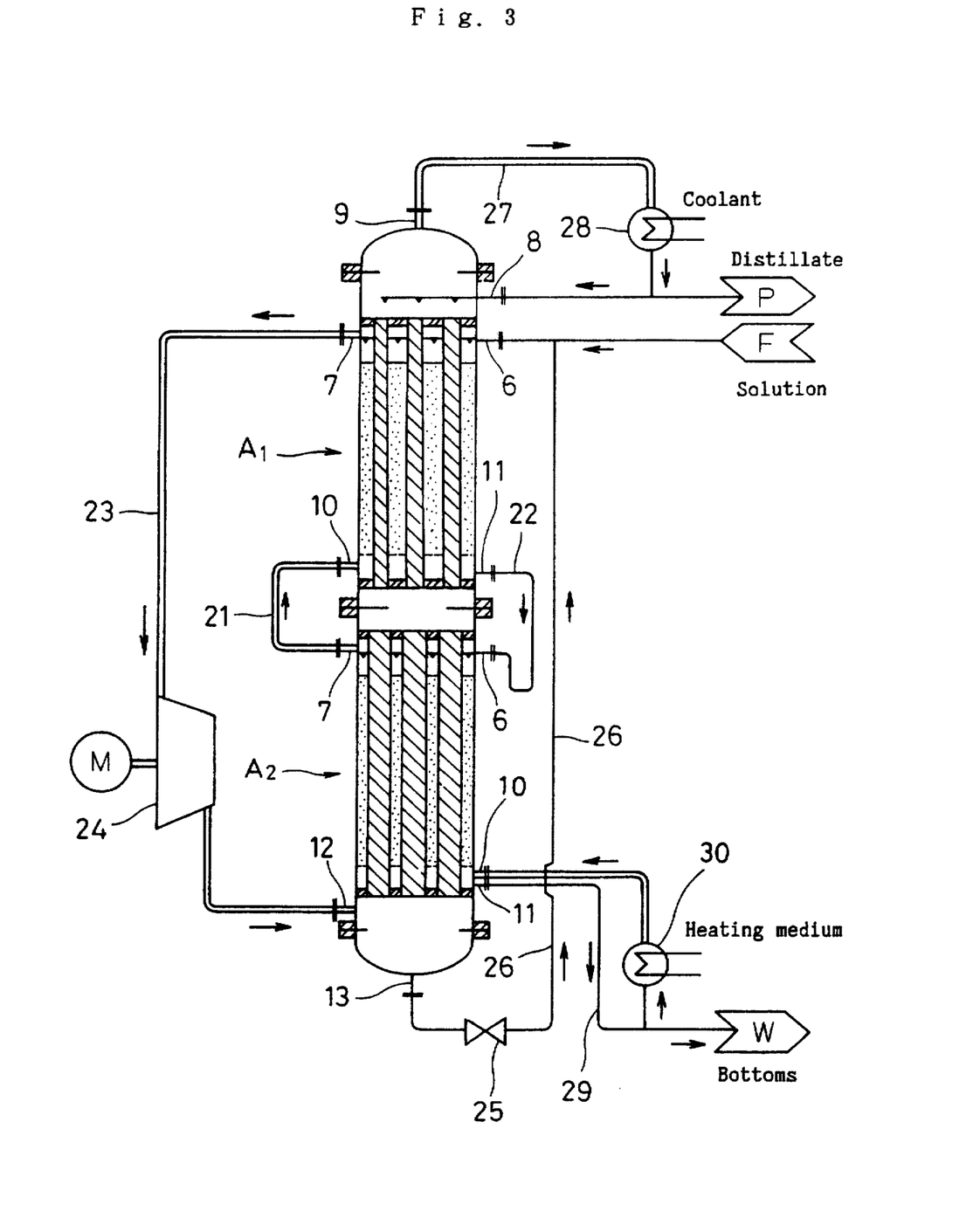
FIG. 3 is a diagram showing a preferred embodiment of the heat integrated distillation column of the invention.

FIG. 3 shows a heat integrated distillation column which is constructed by combining the heat integrated distillation column (structure constituting the column) A shown in FIG. 1. In FIG. 3, portions designated by the same reference numerals as those in FIG. 1 are the portions identical or corresponding to those in FIG. 1.

In this heat integrated distillation column, two stages of the heat integrated distillation columns (structure constituting the column) A ($A_1$, $A_2$) shown in FIG. 1 are stacked.

In this heat integrated distillation column, a solution is supplied to the stripping-section liquid inlet 6 of the structure A ($A_1$) of the upper stage.

The stripping-section liquid outlet 11 of the upper stage is connected to the stripping-section liquid inlet 6 of the structure A ($A_2$) of the lower stage via a pipe 22. The stripping-section vapor outlet 7 of the structure A ($A_2$) of the lower stage is connected to the stripping-section vapor inlet 10 of the structure A ($A_1$) of the upper stage via a pipe 21.

The stripping-section vapor outlet 7 of the structure A ($A_1$) of the upper stage is connected to the stripping-section vapor inlet 12 of the lower stage via a pipe 23. The pipe 23 is provided with a compressor 24 for compressing the vapor.

The liquid extracted from the enriching-section liquid outlet 13 of the structure A ($A_2$) of the lower stage is supplied to the stripping-section liquid inlet 6 via a pipe 26 having a pressure reducing valve 25.

The vapor extracted from the enriching-section vapor outlet 9 of the structure A ($A_1$) of the upper stage is introduced into a condenser 28 via a pipe 27, so that the vapor is condensed and recovered as a distillate, and a part of the distillate is returned to the enriching-section liquid inlet 8.

The liquid extracted from the stripping-section liquid outlet 11 of the structure A ($A_2$) of the lower stage is discharged to the outside of the system as bottoms via a pipe 29. A part of the liquid is vaporized again by a reboiler 30, so as to be returned to the column bottom of the stripping section via the stripping-section vapor inlet 10.

Figure 4:
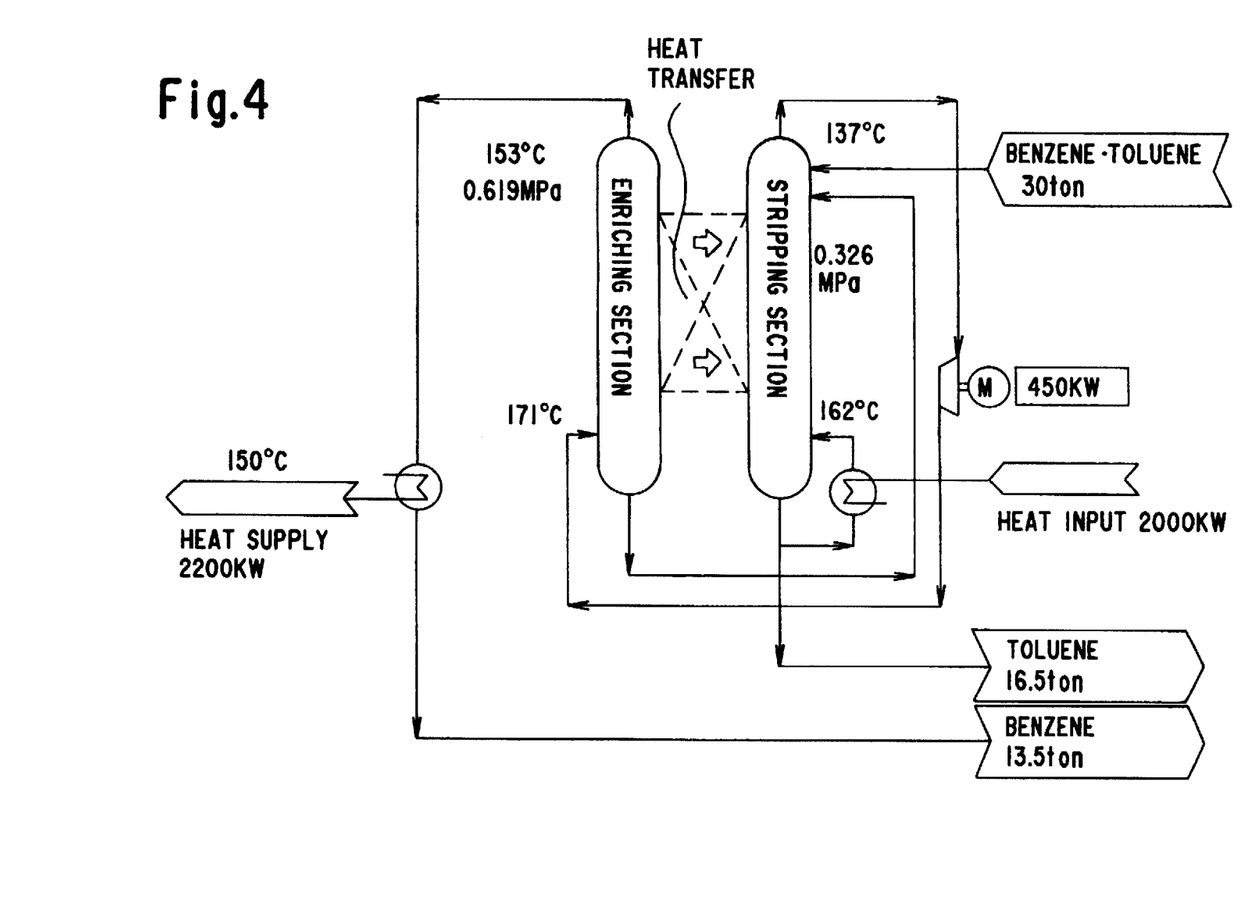
FIG. 4 is a diagram showing an example of an operating condition of the heat integrated distillation column of the preferred embodiment of the invention.

In this heat integrated distillation column, for example, as shown in FIG. 4, in the case where 30 tons of benzene and toluene are distilled so as to recover 16.5 tons of toluene and 13.5 tons of benzene, the heat of 2000 kW is input, the power of the compressor is 450 kW, and the recovered thermal energy is 150° C. (2200 kW). As compared with the above-described conventional distillation column, it is possible to attain remarkable energy savings.

In the above, the embodiment of the invention in which the tube interior is used as the enriching section and the tube exterior is used as the stripping section has been described. Alternatively, the tube interior may be the lower pressure side so as to be used as the stripping section, and the tube exterior may be the higher pressure side so as to be used as the enriching section.

In the above, the embodiment of the invention in which the tube interior is filled with the regular packing and the tube exterior is filled with the irregular packing has been described. Alternatively, the same kind of packing can be used, or the reversed combination of the packing may be used. Furthermore, it is possible to utilize a shelf structure, or a combination of the shelf structure with the charging of the packing.

(2) Other Embodiments of the Invention

Referring to FIGS. 7, 8, 9, and 10, other embodiments of the heat integrated distillation column of the invention will be described.

Figure 7:
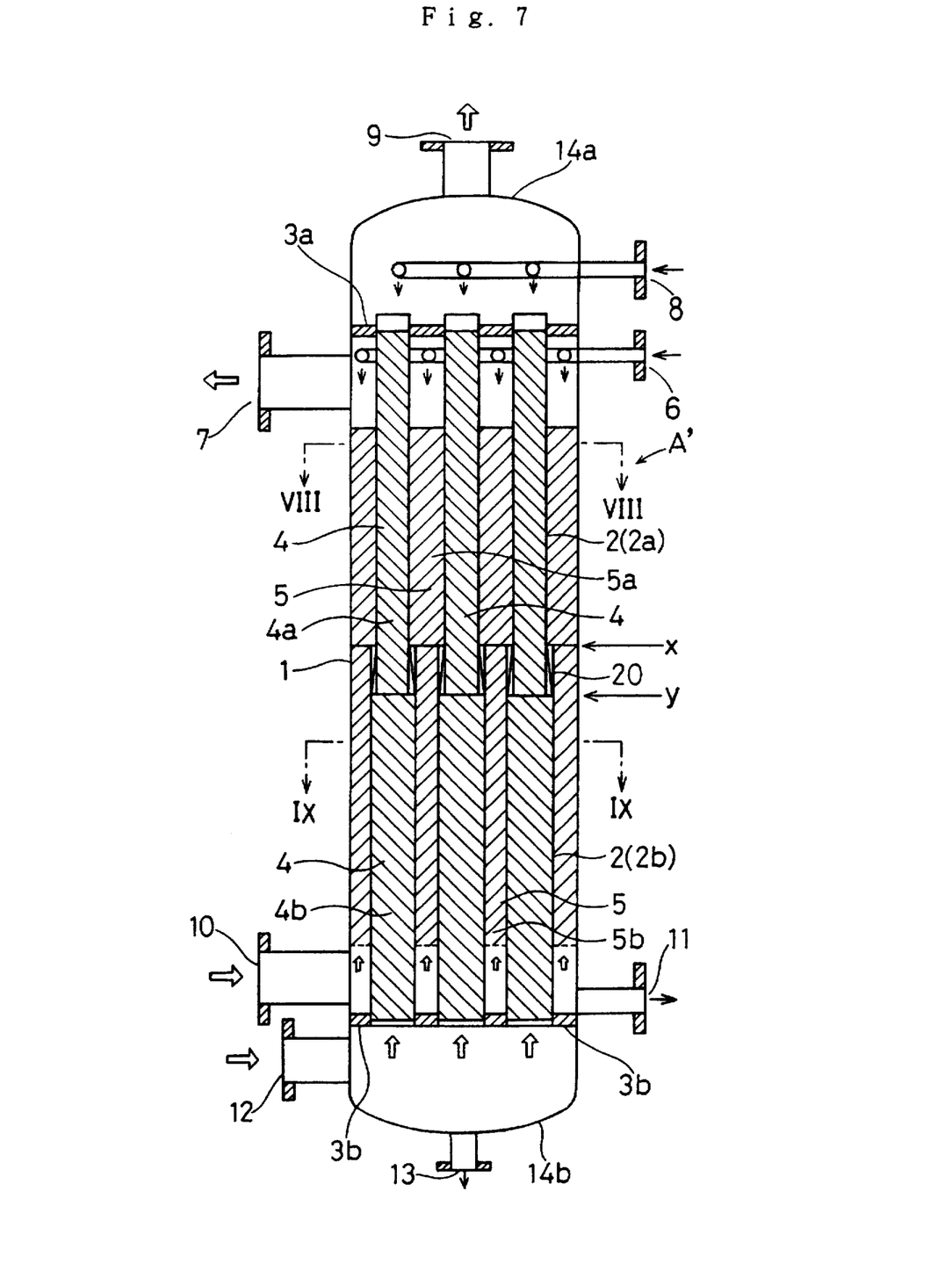
FIG. 7 is a diagram showing a preferred embodiment of the heat integrated distillation column (structure constituting the column) of the invention.
Figure 8:
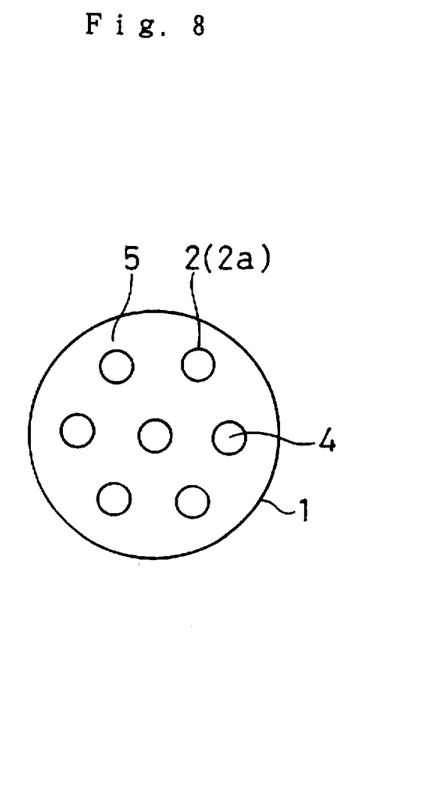
FIG. 8 is a cross section view taken along a line VIII—VIII of the heat integrated distillation column of FIG. 7.
Figure 9:
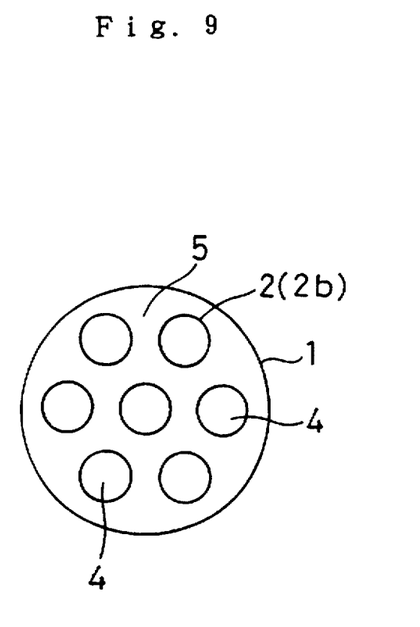
FIG. 9 is a cross section view taken along a line IX—IX of the heat integrated distillation column of FIG. 7.

In this heat integrated distillation column (structure constituting the column) A', a body shell 1 and a plurality of tubes (multitube) 2 which are inserted into the body shell 1 are coupled to the body shell 1 via tube plates (an upper tube plate 3a and a lower tube plate 3b) at both ends, so that the tube interior (enriching section) 4 is isolated from the tube exterior (stripping section) 5 of the multitubes 2.

The multitubes 2 are integrally formed by welding smaller diameter portions 2a in the upper portion with larger diameter portions 2b in the lower portion via a reducer 20. Between the tube plates 3a and 3b at the upper and lower ends, the cross-sectional area of the tube interior (enriching section) 4 above the joint portion is smaller, and the cross-sectional area of the tube interior (enriching section) 4 below the joint portion is larger than that of the portion above the joint portion.

In this invention, there is no specific limitation on the structure of the reducer 20, but generally, a tube and a reducer which is commercially available are joined by butt welding.

A portion of the tube interior (enriching section) 4 extending from the lower end to the level indicated by y in FIG. 7 is filled with regular packing 4b produced for the larger diameter portion 2b. The other portion of the tube interior extending from the position indicated by y in FIG. 7 to the upper end is filled with regular packing 4a produced for the smaller diameter portion 2a.

A portion of the tube exterior (stripping section) 5 extending from the lower portion to the level indicated by x in FIG. 7 is filled with regular packing 5b except for a portion of the shell cross-sectional area into which the larger diameter portion 2b of the multitube 2 is inserted. The portion above the position indicated by x in FIG. 7 is filled with regular packing 5a except for a portion of the shell cross-sectional area into which the smaller diameter portion 2a of the multitube 2 is inserted.

Accordingly, in the heat integrated distillation column of this embodiment, the packagings are not in contact with the tube walls of the tube interior and the tube exterior of the reducer 20, and gaps are formed.

In this embodiment, regular packing is used as the packing with which the tube interior 4 and the tube exterior 5 are filled. Alternatively, it is possible to use irregular packing.

The upper portion of the body shell 1 is provided with a stripping-section liquid inlet 6 for supplying liquid to the tube exterior (stripping section) 5, and a stripping-section vapor outlet 7 for extracting vapor from the tube exterior (stripping section) 5. An end chamber 14a, lying above the upper tube plate 3a and communicating with the tube interior (enriching section) 4, is provided with a enriching-section liquid inlet 8 for supplying liquid to the tube interior (enriching section) 4, and a enriching-section vapor outlet 9 for extracting vapor from the tube interior (enriching section) 4.

On the other hand, the lower portion of the body shell 1 is provided with a stripping-section vapor inlet 10 for supplying vapor to the tube exterior (stripping section) 5, and a stripping-section liquid outlet 11 for extracting liquid from the tube exterior (stripping section) 5. An end chamber 14b, lying below the lower tube plate 3b and communicating with the tube interior (enriching section) 4, is provided with a enriching-section vapor inlet 12 for supplying vapor to the tube interior (enriching section) 4, and a enriching-section liquid output 13 for extracting liquid from the tube interior (enriching section) 4.

Figure 10:
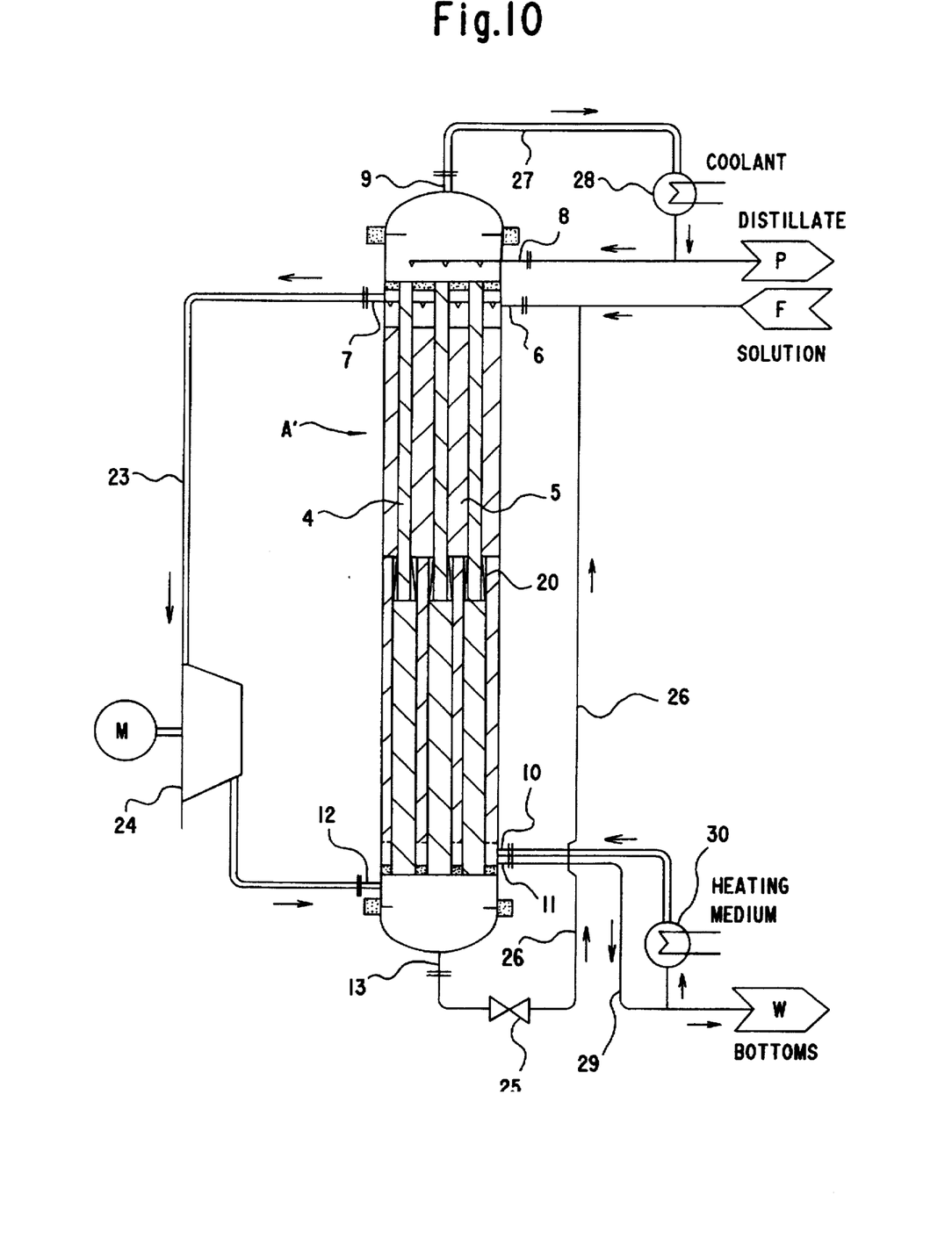
FIG. 10 is a diagram showing a preferred embodiment of the heat integrated distillation column of the invention.

FIG. 10 is a diagram showing a heat integrated distillation column which is constructed by combining the heat integrated distillation column (structure) A' shown in FIG. 7 with a compressor, piping, and the like. In FIG. 10, the portions designated by the same reference numerals as those in FIG. 7 are the portions identical or corresponding to those in FIG. 7.

In this heat integrated distillation column, a stock solution is supplied to the stripping-section liquid inlet 6 of the structure A'. The stripping-section vapor outlet 7 of the structure A' is connected to the enriching-section vapor inlet 12 via a pipe 23. The pipe 23 is provided with a compressor 24 for compressing the vapor. The liquid extracted from the enriching-section liquid outlet 13 of the structure A' is supplied to the stripping-section liquid inlet 6 via a pipe 26 having a pressure reducing valve 25.

The vapor extracted from the enriching-section vapor outlet 9 of the structure A' is introduced into a condenser 28 via a pipe 27, so that the vapor is condensed and then recovered as a distillate, and a part of the distillate is returned to the enriching-section liquid inlet 8. The liquid extracted from the stripping-section liquid outlet 11 of the structure A' is discharged to the outside of the system as bottoms via a pipe 29. A part of the liquid is vaporized again by a reboiler 30, so as to be returned to the column bottom of the stripping section via the stripping-section vapor inlet 10.

In the heat integrated distillation column of the present invention, monotubes or multitubes whose diameters are varied stepwise can be disposed between tube plates at upper and lower ends only by connecting monotubes or multitubes to each other via a reducer. Thus, without requiring a complicated construction, it is possible to surely obtain a heat integrated distillation column which has a simple construction and can be easily produced and maintained.

In the above, the embodiment of the invention in which the tube interior is used as the enriching section and the tube exterior is used as the stripping section has been described. Alternatively, the tube interior may be the lower pressure side so as to be used as the stripping section, and the tube exterior may be the higher pressure side so as to be used as the enriching section.

In the above, the embodiment of the invention in which multitubes having different diameters are connected to each other at one point by a reducer, that is, there is only one changing point where the ratio of the column cross-sectional area of the stripping section to that of the enriching section is changed has been described. Alternatively, as required, the ratio of the column cross-sectional area of the stripping section to that of the enriching section may be changed at a plurality of points, i.e., two or more points. The changing pitch is not particularly restricted. The changing pitch may be regular, or may be varied desirably.

In the above-described embodiments of the invention, the tube interior and the tube exterior are filled with regular packing. Alternatively, one or both of the tube interior and the tube exterior may be filled with irregular packing. Furthermore, one or both of the tube interior and the tube exterior may have a shelf structure, or a combination of the shelf structure with the charging of the packing.

The invention is not restricted to the above-described embodiments also in other points. As for the number of monotubes, the interval between adjacent monotubes, the ratio of the column cross-sectional area of the tube interior to that of the tube exterior, and the like, various applications and modifications can be made within the scope of the gist of the invention.

What is claimed is:

1. A heat integrated distillation column, comprising a monotube or a multitube coupled to a body shell via tube plates at both ends, thereby isolating a tube interior from a tube exterior, means for providing a difference in operating pressure between the tube interior and the tube exterior to define a higher pressure side and a lower pressure side so as to differentiate an operating temperature of the tube interior from an operating temperature of the tube exterior so that a wall of said monotube or said multitube functions as a heat transfer surface, and heat can be transferred from the higher pressure side to the lower pressure side, and said higher pressure side functions as an enriching section and said lower pressure side functions as a stripping section.

2. A heat integrated distillation column according to claim 1, wherein a ratio of a column cross-sectional area of said enriching section to a column cross-section area of said stripping section, column cross-sectional area of said enriching section/column cross-sectional area of said stripping section, decreases toward the top of said column and increases toward the bottom of said column.

3. A heat integrated distillation column according to claim 1, wherein the tube interior is said enriching section and the tube exterior is said stripping section, and a ratio of a total cross-sectional area of the tube interior to a total cross-sectional area of the tube exterior, total cross-sectional area of the tube interior/total cross-sectional area of the tube exterior, decreases toward the top of said column and increases toward the bottom of said column.

4. A heat integrated distillation column according to claim 3, wherein the ratio of the total cross-sectional area of the tube interior to the total cross-sectional area of the tube exterior, total cross-sectional area of the tube interior/total cross-sectional area of the tube exterior stepwise decreases toward the top of said column and stepwise increases toward the bottom of said column.

5. A heat integrated distillation column according to claim 3, wherein the tube interior and the tube exterior are filled with packing, and each of the tube interior and the tube exterior is provided with inlets and outlets of gas and liquid.

6. A heat integrated distillation column according to claim 3, wherein the tube interior is filled with regular packing, the tube exterior is filled with irregular packing, and each of the tube interior and the tube exterior is provided with inlets and outlets of gas and liquid.

7. A heat integrated distillation column according to claim 3, wherein shelves are disposed in the tube interior and the tube exterior, and each of the tube interior and the tube exterior is provided with inlets and outlets of gas and liquid.

8. A heat integrated distillation column according to claim 3, wherein shelves are disposed in the tube interior, the tube exterior is filled with packing, and each of the tube interior and the tube exterior is provided with inlets and outlets of gas and liquid.

9. A heat integrated distillation column according to claim 3, wherein the tube interior is filled with packing, shelves are disposed in the tube exterior, and each of the tube interior and the tube exterior is provided with inlets and outlets of gas and liquid.

10. A heat integrated distillation column comprising a monotube or a multitube coupled to a body shell via tube plates at upper and lower ends so as to a tube interior from a tube exterior, means for providing a difference in operating pressure between the tube interior and the tube exterior to differentiate an operating temperature of the tube interior from an operating temperature of the tube exterior so that a wall of said monotube or said multitube functions as a heat transfer surface, and heat can be transferred from a higher pressure side to a lower pressure side said higher pressure side can function as an enriching section and said lower pressure side can function as a stripping section, wherein each of said monotube or multitube have different diameters and include a reducer, so that a column cross-sectional area increases the top of said column to the bottom of said column in said enriching section, and a column cross-sectional area decreases the top of said column to the bottom of said column in said stripping section, whereby a vapor amount load in said monotube or multitubes is uniform and an ascending vapor velocity does not exceed an allowable velocity.

11. A heat integrated distillation column according to claim 10, wherein the tube interior functions as said enriching section, the tube exterior functions as said stripping section, and the ratio of a total cross-sectional area of the tube interior to a total cross-sectional area of the tube exterior, total cross-sectional area of the tube interior/total cross-sectional area of the tube exterior stepwise decreases toward the top of said column and stepwise increases toward the bottom of said column.

12. A heat integrated distillation column according to claim 11, wherein the tube interior and the tube exterior are filled with packing, and each of the tube interior and the tube exterior is provided with inlets and outlets of gas and liquid.

* * * * *